United States Patent [19]
Othmer

[11] 3,975,617
[45] Aug. 17, 1976

[54] PIPE HEATING BY AC IN STEEL

[76] Inventor: Donald F. Othmer, 333 Jay St., Brooklyn, N.Y. 11201

[22] Filed: Aug. 30, 1973

[21] Appl. No.: 393,043

Related U.S. Application Data

[63] Continuation-in-part of Ser. No. 107,351, Jan. 18, 1971, Pat. No. 3,777,117.

[52] U.S. Cl. .............................. 219/300; 137/341; 138/33; 219/10.49; 219/10.51; 219/301
[51] Int. Cl.² ...................... H05B 3/00; F16L 53/00
[58] Field of Search ................. 219/300, 301, 10.49, 219/10.51, 8.5, 59; 138/32, 33; 137/341

[56] References Cited
UNITED STATES PATENTS

| | | | |
|---|---|---|---|
| 2,066,668 | 1/1937 | Bennett | 219/8.5 |
| 2,761,949 | 9/1956 | Colton | 219/300 |
| 2,857,503 | 10/1958 | Rudd et al. | 219/59 |
| 3,015,018 | 12/1961 | Rudd | 219/59 |
| 3,073,945 | 1/1963 | Osterer et al. | 219/67 |
| 3,617,699 | 11/1971 | Othmer | 219/301 UX |
| 3,706,872 | 12/1972 | Trabilcy | 219/300 |
| 3,766,357 | 10/1973 | Koester | 219/300 |
| 3,777,117 | 12/1973 | Othmer | 219/300 |

FOREIGN PATENTS OR APPLICATIONS

| 756,945 | 9/1956 | United Kingdom | 219/300 |
|---|---|---|---|

*Primary Examiner*—A. Bartis

[57] ABSTRACT

When an insulated conductor wire is adjacent to and coextensive with the outside of a steel pipe transporting a fluid and it carries alternating current as one leg of a circuit, with the pipe itself carrying the AC for the return leg, induction and magnetic effects develop which cause the AC flow to concentrate on a band of the surface or "skin" of the pipe close to the wire, thus greatly increasing the resistance of the pipe wall and the heat produced therein. No current is carried in the inner wall of the pipe nor in that part of the outer wall removed from the wire; and there is no current loss to the ground or other surroundings. The insulated conductor wire may be uncovered throughout those portions of its outer surface not directly confronting the pipe by any electrically conductive material which would shield the electromagnetic field generated around the wire in a direction away from the pipe, or it may be covered by a shaped cover of electrical insulation material. However, electrically conductive shielding members may be provided between the wire and the pipe on each side of the wire to trim the effective width of the heating band on the pipe. The conductor wire may comprise a pair of elongated conductors arranged in spaced parallel relation and electrically connected throughout their respective lengths by electrically conductive material having a positive temperature coefficient whereby the current flow and thus the heat generated is automatically regulated in accordance with temperature. Two parallel and adjacent transport pipes may be used, each insulated from the other, and with one taking the place of the conductor wire as the one leg of the circuit. Alternatively, three such pipes may be used, each for one phase of a three phase AC supply, and with electrical connections between the three pipes at their for ends to give a "Y" connection. In such an arrangement, each pipe acts as a conductor wire in cooperation with the other two adjacent pipes.

20 Claims, 21 Drawing Figures

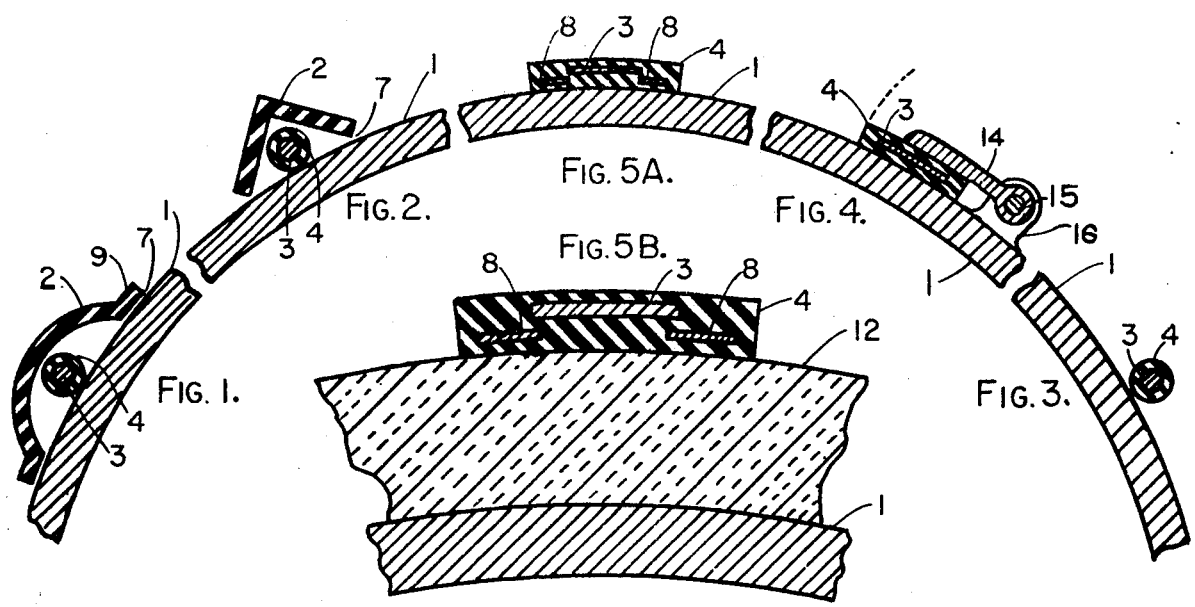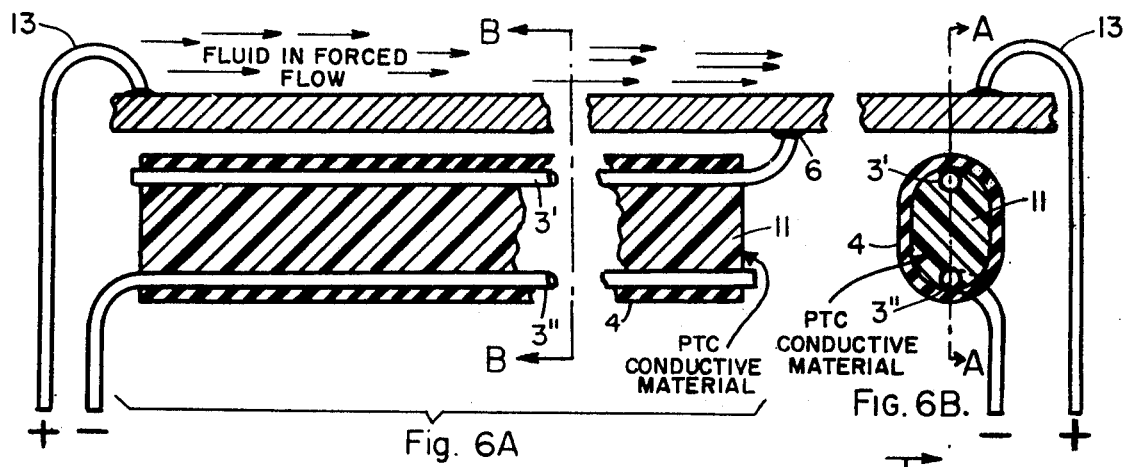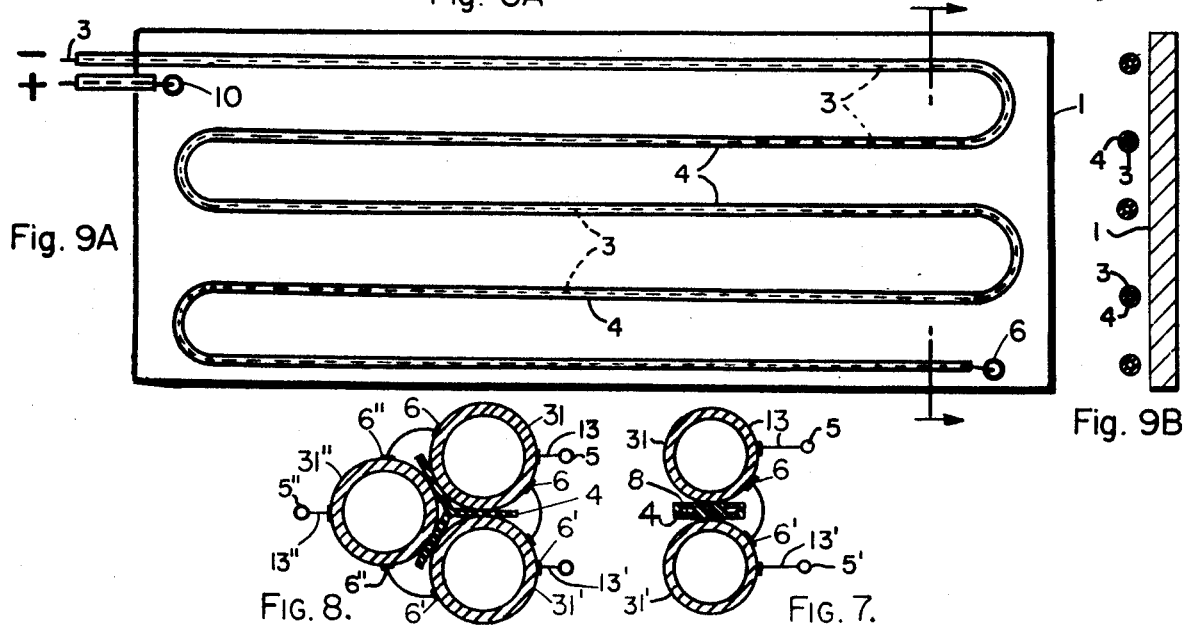

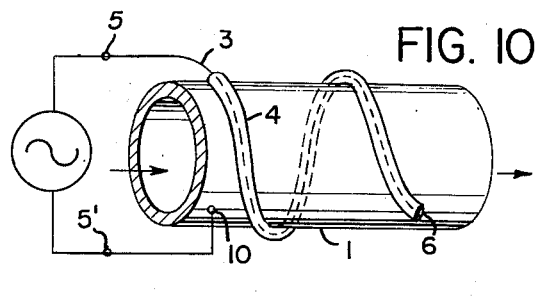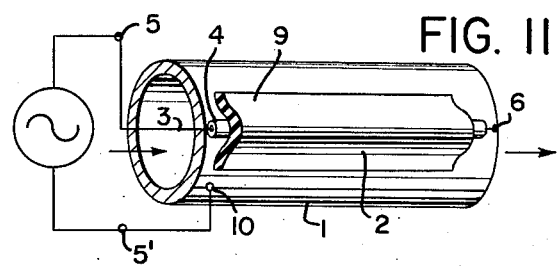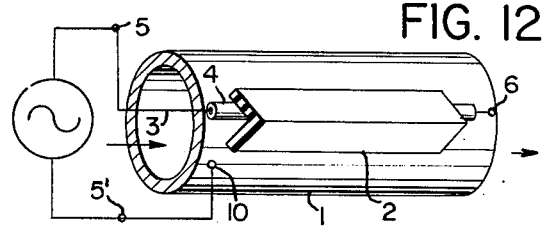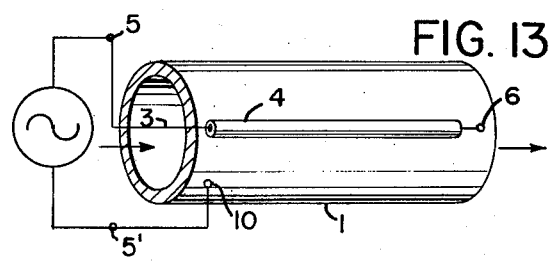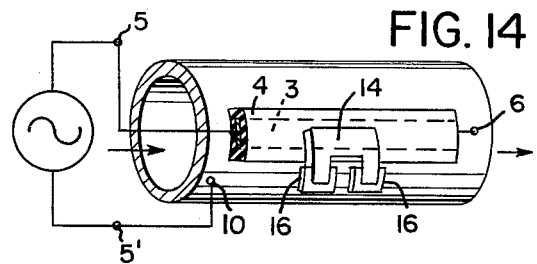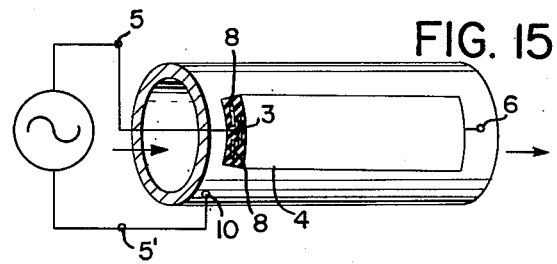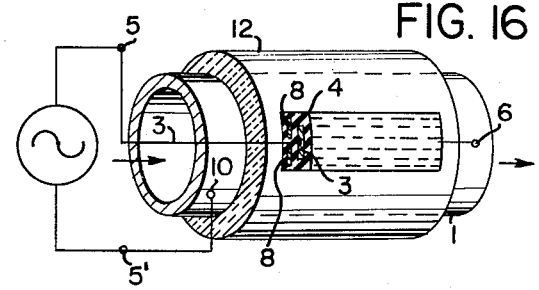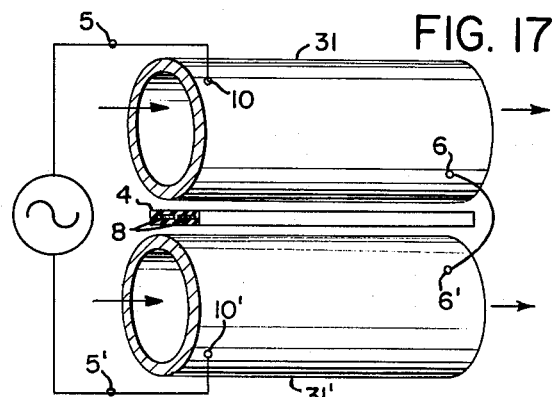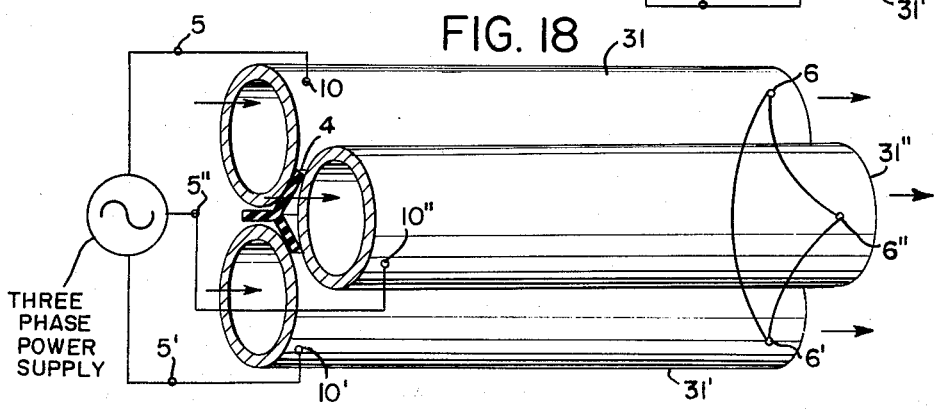

PIPE HEATING BY AC IN STEEL

This is a continuation in part of application Ser. No. 107,351, filed Jan. 18th, 1971, now U.S. Pat. No. 3,777,117 of Dec. 4, 1973, entitled "Electric Heat Generating System."

This invention relates to the use of an insulated electrical conductor wire carrying alternating current (AC) in an "out" leg of a circuit; and the AC flows back through an adjacent and substantially parallel, elongated steel shape to supply the return or "back" leg of the circuit. A skin effect in the localized surface of the steel shape or conductor which is in a band immediately adjacent to the wire, is developed by induction and magnetic effects and causes two quite important phenomena:

a. the substantial reduction and localization of the path of flow of the AC both as to depth and width of the effective conductor path in the cross-section of the steel wall, so as to increase greatly the effective resistance of the steel conductor, and b. the production of a substantial insulation ability against any electrical contact with the balance of the steel shape in two dimensions — both depth and width — and particularly on the surface, away from the band both inside and outside. The proximity relation of the two conductors — out and back — and proper electromagnetic shielding increases further these effects, the basis of the present advantageous system.

Alternating current flows only along a band of the skin of the elongated piece of steel acting as a very specialized conductor under these conditions. (The word "steel" is used hereinafter to represent any magnetic, electrical conductive material, since steel is the most common such material.) As an example, a pipe may be considered which has a minimum wall thickness off at least twice the skin depth, or preferably about ⅛ inch, less for many steels. AC may be conducted out to the far end of the pipe by an adjacent, external, and insulated wire which is connected there to the wall. Due to what is called the "skin effect", substantially all of the AC flows back on that part of the outside surface or skin of the pipe which is immediately adjacent and parallel to the conductor wire. This band of the steel surface subtended from the wire becomes what may be called a skin effect conductor-resistor. The balance of the surface of the pipe, both inside and out, is, for practical purposes, completely insulated electrically from any object contacting it. This considerable reduction of what is normally regarded as the effective cross-section of an electrical conductor (the entire pipe), greatly increased the effective resistance of what otherwise would be entirely a conductor. Thus, steel pipes through which oil or other utilitarian liquid is transported, may be of such very substantially cross-section of metal, compared to that of the usual copper wire conductor, that they could not practically be used as a conductor-resistor. By this invention, AC flow is limited to this narrow band of skin; the pipe offers greatly increased resistance; and this new technique allows such pipes to be used for resistance heating with AC, for which they would be quite unsuitable with direct current.

It has been found that pipes designed in accord with this invention have considerably more resistance than those of the copending application Ser. No. 107,351, now U.S. Pat. No. 3,777,117, of Dec. 4, 1973 which may depend upon the skin effect of the entire inside circumferential surface of a pipe transporting a fluid. Since AC flows only in this band on a small part of the outside surface of such a pipe of the present invention, i.e., that part immediately adjacent to the external wire which is adjacent and insulated, the inner wall of the steel pipe is, for practical purposes, perfectly insulated from the AC and may carry liquids which conduct electricity. Most of the outer pipe wall is also non-conductive, and the pipe may be grounded and even touched without shock, even though it is of considerable size. The pipe thus may be used for transport of liquids which must be kept heated in transit or reheated after a shutdown, because of the greatly reduced cross-section, and decrease of effective area of this conductor-resistor. In normal use, the utilitarian fluid, usually a liquid, is forced through the pipe by a pump or other positive means.

If such an insulated conductor wire is extended along the length of an element of a steel pipe and covered with a concave covering strip or shape which should be a non-conductor of electricity; e.g., a plastic shape such as might be formed by extrusion of a thermoplastic resin, in this case all of the heat from the AC flow is generated within the pipe wall, in a band subtended by the wire as the skin effect conductor-resistor; and the plastic shape protects the wire.

In many cases, the wire may be wrapped as a helical coil around and along the pipe; and the concave cover, if used, may again be of an insulating material. The flow of return AC is in the skin band subtended by the wire. The return current follows the band and the shape of the wire, which may be a much longer path than the shortest distance — the length of the pipe.

In the use of this invention, a utilitarian fluid, as opposed to some casual fluid in the vicinity, is heated by the steel shape against which the fluid is forced by pump, blower, gravity, convection, or other means. The steel shape is heated by a skin effect conductor-resistor therein limited in cross-sectional area by the skin effect and the proximity effect, which offers increased resistance to, and hence heat from, the return leg of the AC circuit.

While the steel shape often may be a pipe and the utilitarian fluid may be a liquid being forced therethrough, in other cases, the steel shape may be other than tubular — e.g., planor, conical, spheroidal, etc.; and the utilitarian fluid may be heated by being passed or forced into contact therewith, rather than transported thereby.

HEATING OF PIPELINES BY SKIN-EFFECT AS IN PRIOR ART

Long distance pipelines which require heat to give a lower viscosity to the heavy oils at higher temperatures, particularly at start-ups, have used heat-tubes, but with low heat fluxes to date, a maximum of from 10 to 15 watts per foot. Skin effect heating of pipelines, even with the low performance of the prior art, has large advantages over other systems which have been used with steam or other hot fluids. Tracer tubes can be heated economically throughout their length by the skin effect, using AC, which has frequencies of the standard 50 to 60 cycles of conventional AC generation, and lower and higher, as described in copending application Ser. No. 107,351 now U.S. Pat. No. 3,777,117 and U.S. Pat. No. 3,617,699. These patents develop the theory and practice of the effective use of the skin effect, in various designs and sizes of pipelines and other heat-generating equipment; also the influence on their design and operation of the proximity effect, the change in the number of cycles of the AC used, and of other parameters. Particularly, the influence of these factors on the effective electrical resistance of large steel pipes, has been demonstrated; and it becomes increasingly important to increase this resistance as pipeline size increase, and the cross-section of what would be the normal conductor becomes so very large.

Also developed were the controlling engineering factors in design, such as materials of construction of heat-tubes, conductor wires, their insulations under different conditions, the fluids to be transported, and the use of heat-tubes as heaters generally. On all of this as a background, the present invention is based.

Simply, in a heat-tube, an internal electric wire forms one leg — out — of the AC circuit; and its other terminal is at the far end of the heat-tube on the inside thereof. The return leg of the circuit is the inside wall of the heat-tube because of the skin effect, with very little current flowing on the outside wall if the steel tube is more than about twice the so-called effective skin depth of about 0.04 inches; in usual steels, the total thickness need not be more than about 3 times this — or about ⅛ inch. The other junction to the source of AC is a point at the near end of the inner surface of the heat-tube adjacent to the entrance of the insulated copper wire into the heat-tube to carry the AC to its far end.

Improved designs of the heating tube described in the cited patents made the heat-tube conform closely to the external surface or to form an integral part or, indeed, the entire wall of the oil pipe. These designs allow much greater heat fluxes than formerly thought possible, with important advantages and economies in the costs of pipe, of heating, and of insulation. By correct design, the AC was made to travel several times the length of the pipe through spiral wound heat-tubes, rather than through the straight line path through the metal as normally would be quite the least resistance.

An internal electric wire or tube made of steel instead of the usual copper for the "out" conductor leg also was used to give an additional resistance due to a second skin effect, the increased resistance of which generates still more heat.

Particularly, even very large steel pipes for oil transporting were shown to be possible heat-tubes by themselves. Only an internal conductor is necessary, with greatly reduced costs of installation and maintenance. By moving the location of the internal conductor away from the axis of the tube, the effective resistance of the "skin" of the oil-pipe was again increased greatly, an important consideration in large oil-pipes. This is due to what is called the proximity effect.

FUNDAMENTALS OF THE PRESENT INVENTION

Skin Effect Caused by Inducted Magnetic Flux

Skin effect is a phenomenon of an AC circuit which restricts the AC flow to the surfaces of iron and steel conductors-resistors which are operating in electromagnetic fields. Commercial AC frequencies of 50 to 60 cycles per second are used with another adjacent conductor carrying AC so as to generate surface magnetic in induction effects with corresponding diffusional functions of the AC. With appropriate circuitry long known in the art, all three phases of standard AC current generation may be used to advantage, as may frequencies in the range of from 10 to 1000 or more per second, which range may be produced with conventional alternators.

The electromagnetic flux surrounding a wire carrying an AC extends until shielded by another metal. Thus, the transport pipe itself was used as a heat-tube in the copending application, now U.S. Pat. No. 3,777,117, with an internal wire on the axis or the bottom of the pipe.

To insure that there is no current leakage or danger from the high voltage AC which flows on the inside skin, the minimum thickness of the steel pipe wall was found to be at least 2 times, and usually preferably 3 times, the skin thickness, or about ⅛ inch, with usual steels under the usual characteristics of the AC flow used. There will then be no practical voltage or power loss, even when the outside of the heat-tube is grounded or submerged in salt water. Conventionally, unburied pipelines are grounded at reasonable distances and they should be in the present invention; also, if installed in corrosive conditions, they may have the conventional sacrificial cathodic protection system with no interference with the skin effect heating.

PROXIMITY EFFECT

The proximity effect is a very important aspect of the electromagnetic field produced by an AC passing through an inner wire conductor in penetrating the return leg of the circuit, the steel wall of the pipe. This was analyzed in the copending application 107,351, now U.S. Pat. No. 3,777,117 of Dec. 4, 1973 for a steel heat-tube having a diameter which is large compared to that of the electrical conductor wire. Increase of the effective resistance up to 25 times or more of that when the wire was on the pipe axis, was found for the pipe wall when the insulated wire was simply laid on the bottom.

The combination of the skin effect and the proximity effect is equally important in some examples of the present invention, which has, however, a different geometry of the arrangement of the conductor wire and of the return conductor of steel. Usually, this steel conductor is a transport pipe, the effective resistance of which must be increased greatly for practical usage. In the example of a circular conductor wire, the insulation of which contacts the outside element of a steel pipe, the effective resistance of the return circuit has been found to be substantially that of a skin effect conductor-resistor, for practical purposes considered as cut out of the steel wall, with the usual depth of the skin and an effective width of only a narrow band of the pipe subtended immediately under and adjacent to the element of the pipe to which the insulation of the wire is adjacent.

The thickness of the insulation on the wire limits this effective distance of the wire from the pipe wall in the present invention, as does also the shape of the cross-section of the wire. A flat conductor ribbon tightly held against the outer pipe wall, with a minimum thickness of suitable insulation between, would give the least distance between; and the proximity effect would be most effective. Similarly, in the copending application, now U.S. Pat. No. 3,777,117 a flat wire, when placed against the inner surface of the pipe, gave the greatest effective resistance of the skin of the pipe wall. In the present invention, the convexity of the exterior wall of the pipe against the wire (of any shape) accentuates greatly the increase of resistance of the skin of the subtended band, as compared to the concavity of the inner surface of the pipe wall. This is because in addition to (a) the skin effect, and (b) the proximity effect as has been previously demonstrated, there is also (c) a "shielding" effect which does not pertain when the wire is entirely encompassed by the pipe.

Now it has been found desirable in some cases to have a flat wire when possible as close to the surface of the metal as not more than about 5 to 12 times the so-called penetration depth. With usual steels, this would amount to about 0.2 to 0.5 inches. The distance includes the thickness of the electrical insulation. Since the flatter the wire, if of the same cross-sectional area, the greater its width will have to be for the same electrical capacity — and therefore the greater the width will be of the band of the skin effect conductor-resistor subtended by the electromagnetic flux generated by the wire.

In general, however, the effective width of this band which returns the current carried in a flat insulated conductor wire closely held against the wall will be the sum of the width of the flat wire plus about two to three times the skin penetration or depth on each side, i.e., the total may be the wire width plus about 4 to 6 times the skin penetration. This depends on the effective distance the conductor wire is from the steel.

If flat steel wire is used as the conductor, the desirability of taking advantage of the skin effect in this as well as in the pipe wall has been considered in the copending application now U.S. Pat. No. 3,777,117. If a thickness of the flat sheet band is greater than about twice that of the skin depth, all of the rest of the thickness of the steel wall of the band becomes an insulator, more effective as the thickness increases. This aspect of the use of steel as an insulator must be balanced against the use of a more or less standard insulation, which would have to be used — applied, coated, drawn on, etc. on the inner or pipe side in any case.

Movement of the wire in relation to the pipe changes greatly the proximity effect, the pipe's resistance, and the heat generated.

SHIELDING

An electromagnetic flux, as that generated by the AC flow in the conductor wire, is shielded or arrested by an electrical conductor. This shielding is what reduces the penetration of the flux into the sheet wall of the pipe and causes the skin effect. Shielding is also closely related to the proximity effect, particularly in the convex outer pipe wall with a wire carrying AC adjacent to one of its elements.

In some cases, it may be desired to narrow the width of the band in the pipe wall of this skin effect conductor-resistor which returns the AC. As indicated above, for a conductor very near the wall, this may extend about twice the value of the skin penetration depth, or about 2 × 0.04 or 0.08 inches, on each side beyond the width of the wire, depending on the distance of the wire from the wall. This much of the wall of the pipe on either side of the pipe wall will carry AC, rapidly decreasing to a very low voltage and amperage as the distance increases from either side of the flat conductor wire.

If the insulation which must be formed around this flat wire extends more than two or three times the value of the penetration depth on either side of the wire itself, it insulates very effectively the balance of the pipe wall from any possible contact or short.

As an additional precaution, the insulation may be formed even wider, so that it extends more than 3 or more times the penetration depth on each side of the wire, with either continuous or discontinuous conductor ribbons formed-in, along the sides. These will shield the steel pipe wall and give an effective width of the band of skin which returns the AC current, which width need be no wider than that of the conductor ribbon itself, thus amply insulated by the insulation of the ribbon from external contact.

OBJECTS OF THE INVENTION

Some of the objects and accomplishments of this invention, in the design and use of systems for skin effect heating, are:

1. Decrease in the effective width, thus increase in resistance of the skin effect conductor-resistor adjacent the conductor wire.
2. Use of a conductor wire entirely non-enclosed by the steel pipe or other shape, when the heat tube is at least partly made up of the wall of a transport pipe carrying a fluid.
3. Simplification and cheapening of materials and construction, including thermal insulation for pipelines and other heated surfaces.
4. Use of the conductor wire unenclosed by a heat-tube and out of contact with the fluid being transported in a pipe.
5. Use of a simple, insulated conductor wire as the only element of a heat-tube to be added to an existing transport pipe, adjacent to the pipe wall — sometimes outside the thermal insulation.
6. Use of a simple insulated wire adjacent to a steel surface of any shape to heat it by the skin effect resistance developed to AC flowing as the back leg of the circuit in this band of a skin effect conductor-resistor.
7. Use of a special conductor wire cable itself as a thermostat to control the heat input to and temperature of a steel surface and hence of any adjacent fluid.
8. Elimination of stresses set up thermally in a steel structure, e.g., a steel transport line, which are caused by the welding thereto of a heat-tube.
9. Use of another adjacent pipe as the conductor wire for mutual skin effect heating; also use of three such adjacent pipes for mutual heating when used as three legs of a 3-phase AC circuit.

FIGURES

In this invention and in the figures, only AC is used. All figures, including electrical wiring, are diagramatic, without scale and in the wiring diagrams, insulation of the wires is usually not shown. Thermal insulation is not shown usually in the Figures as it is not a part of this invention by itself. Circulation of fluid is indicated merely by arrows which show direction of flow; and means for causing such a flow, e.g., a pump, is not shown.

FIGS. 1 and 2 are cross-sections of a conventional insulated conductor wire running adjacent to the wall of a transport pipe, and concave shapes of insulating material covering the electric wire.

FIG. 3 is the cross-section of a conventional insulated electric wire against the outside of a transport pipe.

FIG. 4 is the cross-section of an insulated electric wire of rectangular cross-section against the outside of a transport pipe, with means for increasing the distance of the wire from the pipe.

FIG. 5A is the cross-section of the insulated wire of FIG. 4, but with shielding strips of metal imbedded in the insulation.

FIG. 5B is an enlargment of the cross-section of the special wire of FIG. 5A, showing the insulated wires outside of a layer of thermal insulation.

FIG. 6A is a cross-section parallel to the axis of a special conductor wire cable electrically connected to a special steel shape, also in cross-section.

FIG. 6B is a cross-section at right angles to the axis of FIG. 6A.

FIG. 7 is a cross-section of two transport pipes, each of which acts also as the conductor wire for the other.

FIG. 8 is a cross-section of three transport pipes, each of which acts also as the conductor wire for the other two in a 3-phase circuit.

FIG. 9A is a plan view of a steel sheet heated by a simple insulated wire as one leg of an AC circuit; and a subtended band of a skin effect conductor-resistor of the steel is the return leg.

FIG. 9B is the cross-section of FIG. 9A, showing a fluid in forced flow against the surface of the steel sheet.

FIG. 10 is a diagram of an AC circuit wherein an insulated wire is wrapped spirally around a transport pipe.

FIG. 11 is a diagram of an AC circuit wherein an insulated wire on a pipe wall is protected by a plastic cover of a concave cross-section.

FIG. 12 is a diagram of an AC circuit wherein an insulated wire on a pipe wall is protected by a plastic cover of an angular cross-section.

FIG. 13 is a diagram of an AC circuit wherein an insulated wire runs along an element of a pipe wall.

FIG. 14 is a longitudinal elevation and the circuit of FIG. 4.

FIG. 15 is a longitudinal elevation and the circuit of FIG. 5A.

FIG. 16 is a longitudinal elevation and the circuit of FIG. 5B.

FIG. 17 is a longitudinal elevation of the two pipes and the circuit of FIG. 7.

FIG. 18 is a longitudinal elevation of the three pipes and the circuit of FIG. 8.

HEAT-TUBES INCOMPLETELY ENCLOSED IN STEEL

All of the heat-tubes of the prior art using skin effect electric heating have been surrounded by and thus completely encompassed or enclosed in a steel or pipe (except for the ends which are not a part of the heating effect). Particularly this is the case with the preferred type wherein some part of the wall of the heat-tube is also a part of the wall of the transport pipe. Herein, the term 'completely enclosed' or encompassed refers to the longitudinal run of the pipe, as would be shown in a typical cross-section at right angles to the axis; and the entire perimeter of steel is of unbroken metal, and with any juncture otherwise exposing a crack filled with welding, also ferromagnetic.

Now it has been found that the steel wall exhibiting the skin effect need not encompass the wire in those cases where some part of the transport pipe wall generates some part, or all, of the skin effect heating produced by the heat-tube, as the term has been defined in U.S. Pat. No. 3,617,699 and the copending application 107,351 now U.S. Pat. No. 3,777,117, of Dec. 4, 1973. Various advantages accrue, a principal one being that the pipe is not heated, unevenly, by welding on the heat-tube, thus endangering its strength due to thermal stresses.

Particularly, it has been found convenient, desirable, and more economical in construction if that part of the return AC circuit which returns through the transport pipe wall is confined as the main or entire return circuit within a narrow band of skin effect conductor-resistor.

In prior use of a heat-tube isolated from the transport pipe, but adjacent thereto and in practice welded thereto, as described in U.S. Pats. Nos. 3,293,407 and 3,591,770, the skin effect resistance was confined to the inner wall of the external and isolated heat-tube. Thus, even though there is contact, or usually welding to the wall of the transport pipe, no current could flow and no heat could be generated within the wall of the transport pipe. This is because, by definition, the heat-tube was of steel sufficiently thick to prevent current flow and heat generation on its outside surface, which is in contact with the transport pipe; thus, none could be generated in the welding bead nor in the pipe itself. The present invention is concerned with the use of the insulated conductor wire adjacent to or in direct contact with the steel to be heated, most often the wall of a transport pipe, so that heat is generated directly within the steel wall itself which is otherwise at too low a temperature.

Now the effective 'perimeter' of the heat-tube has shrunk correspndingly, from the former circumscribing tube or pipe. This perimeter is now the effective width of the "band" of skin effect conductor-resistor which carries the return AC current. Hence, its cross-sectional area decreases with increase of the 'opening' because the depth of penetration (i.e., that of the skin) is constant; and the resistance of the return leg of the AC circuit increases correspondingly. When the 'opening' is 180° — for a flat piece of steel — or more than 180° outside a pipe, the band of this skin conductor is simply that part of the adjacent steel surface which is subtended and falls effectively within the electromagnetic flux created by the flow of AC in the adjacent wire.

This is a very important consideration in the design of long distance pipelines, particularly in those where the pipe size is large. It was shown in the copending application 107,351 now U.S. Pat. No. 3,777,117, of Dec. 4, 1973 that, by the proper use of the combination of the skin and proximity effects, and by the choice of the number of cycles of the AC, the effective resistance of the steel pipe acting as the return leg of the AC circuit could be varied by over a thousand fold. By narrowing the width of the band of the skin effect conductor-resistor by the methods of this invention, another very large factor may be used to multiply this ratio of the increase of the resistance as shown in this invention.

Similarly, this invention may be used to heat fluids caused to flow outside of pipes and in contact with their walls, and indeed to heat other materials, including solids, which may be in contact with a steel shape so heated.

Copending application 107,351 now U.S. Pat. No. 3,777,117, of Dec. 4, 1973 describes the heating of fluids flowing in contact with the walls of a combined heat-tube and transport pipe, either internally or externally. This heat-tube pipe may also be used in accord with this invention, wherein the wire is not enclosed by the pipe, as described herein. Of equal advantage, another piece of steel shaped like a tube or in another form and without enclosure of the wire, may be used with the wire carrying the 'out' leg of the AC current attached thereto; and the steel shape carrying the return leg in the skin effect conductor-resistor in the steel, subtended by the wire. This skin heater for a steel plate or other shape may have the wire attached thereto in almost any pattern; and on either side of a formed sheet of suitable thickness, and utilizing all three cycles of such AC.

HEATING WITH THE WIRE COVERED

FIG. 1 shows the cross-section of a heat-tube formed by the pipe wall, 1, a skin effect conductor-resistor. The wire, 3, with its insulation 4, is laid along an element of the pipe and is covered by a concave strip or shape, 2, of plastic or other non-conductive material. This may, or may not, have flanges, 6, to conform generally with the pipe wall. A thin crack, 7, between the pipe and the two flanges of the cover strip, is present throughout the length of both.

The electrical connections are shown in FIG. 11 and are analogous to those for a heat-tube: the wire is connected at the near end to one terminal of the AC, on the far end to the external surface of the pipe. The near end of the pipe is connected to the other terminal, 5, of the AC. The skin effect develops in the band of steel under the wire.

The cover, 2, may be made of any non-magnetic and non-conducting material, such as a plastic. It is made wide enough to cover that band of the wall of the pipe subtended by the wire as a skin effect conductor-resistor. The current intensity, along the sides of this band, decays rapidly as the distance from the axis of the band increases. The effective total width depends principally on the size of the wire, and thus its effective distance from the steel, also particularly therefore the thickness of its insulation. For round wire, the effective width of the skin effect conductor-resistor band is usually not more than about 25 to 50 times the value of the penetration or skin depth.

Heat generated within the pipe wall passes directly to the rest of the wall and thence to the fluid.

Thus, the system of FIG. 1 may be used either with or without a plastic cover over the conductor wires, properly connected, running along one or more elements of the pipeline. If more than one, they should usually be spaced apart at least 100 times the value of the penetration depth. The wire may also be wrapped around the transport pipe in a helix of whatever pitch may be desired — with, however, a desired minimum spacing of coils of not less than about 100 times the value of the penetration depth. This use of a helical heat-tube is described more fully in U.S. Pat. No. 3,617,699; and the present invention adds to that in the use of a simple insulated wire as the only part required to be added to the pipe itself to give the skin effect conductor-resistor hitherto found only in a heat-tube encompassing the wire throughout its length.

Similarly, any desired pattern within the aforementioned spacing may be laid out on a steel shape other than that of a pipe, either flat or curvilinear, for various other heating purposes, such as heating fluids passed in contact therewith, etc.

FIG. 2 illustrates another of the many elongated concave cover shapes of plastic, which may be used. Here it is an angle, used as described above for FIG. 1. A standard angle shape is conveniently used — as may also other strips of plastic which are available in concave shapes.

Again, the angle of plastic may be used in a helix around a pipe, or on a flat plate or other steel sheet, as described under FIG. 1. FIG. 10 shows the wiring diagram of the helical curve on the pipe surface of the wire, either with or without the cover.

HEATING WITH WIRE UNCOVERED

FIG. 3 shows in cross-section the simplest embodiment of the invention, and is a conventional insulated wire held in place against the pipe's outer surface, either along an element, a helix, or other desired pattern. Again, the electrical circuitry as shown in FIG. 13 is the same; and again, the return path, that of the skin effect conductor-resistor, is subtended by the permeation of the electro-magnetic flux into the outer surface of the steel pipe — dependent on both the proximity effect and the skin effect, with an effective width of about 25–50 times the value of the permeation depth, depending upon the size of the wire and the thickness of its insulation. The wire diagrammed in this and other figures may be used either along an element of a pipe, or as a helix in FIG. 10 or other pattern of proper spacing on the pipe wall.

This wire, by itself, may similarly be used to generate heat in a steel shape other than a pipe wall, as described under FIGS. 9A and 9B.

A valuable variation of the conventional wire of FIG. 3 is the flattened, insulated wire or ribbon of FIG. 4 which has a width greater than its thickness. To secure the maximum benefit of the proximity effect, i.e., the minimum width of the skin effect conductor-resistor band and thus its maximum resistance, the conductor's effective center should be as close to the pipe wall as possible. This may be approached by using a flat wire or metal ribbon. However, as it becomes wider, it subtends a wider band of the steel skin for reverse flow, with a corresponding lessened resistance in the steel conductor for return. The optimum ratio of these dimensions depend on the electrical characteristics required of the circuit. The electrical insulation is applied in a conventional manner, and if made somewhat wider than otherwise necessary; i.e., 2 to 6 times the value of the penetration depth on each side of the wire ribbon, it covers the entire band of the return skin conductivity and thus insulates it against possible mechanical contact and shock or short.

This wire design and usage lends itself best to the application of thermal insulation to the transport pipe over the wire, because of the minimal protuberance of the heating wire.

FIG. 14 is an elevation view of FIG. 4 and also shows the conventional wiring diagram. The special fittings, 14, 15, and 16 are described below.

Conventionally, copper or aluminum conductor wires or ribbons would be used, but steel may also be used, particularly here as a ribbon, where heat generated by usual line loss or that due to skin effect in the steel conductor often may be transferred readily through the thin electrical insulation to the pipe wall. If the steel ribbon or band is thicker than the effective penetration depth or skin thickness, then only the skin thickness is the effective thickness for carrying AC. Any greater thickness of the steel ribbon becomes that much electrical insulation. As noted in the copending application now U.S. Pat. No. 3,777,117, this insulating value of steel increases extremely rapidly with thickness (as an exponential function) as contrasted with the first power function for ordinary insulating materials.

FIG. 5A is a modification of FIG. 4 and includes as an additional feature a shielding border, 8, on each side of the flat wire to 'trim' the width of the effective band of the skin conductor beneath. Thus, this band cannot extend beyond a predetermined width to expose some part of the pipe surface which has an appreciable current flowing therein. These shielding strips are surrounded by the molded insulation and may be either single pieces, thin ribbons of copper or aluminum, or made up of a mass of lengths of metal fibers or wires. Either serves to shield the steel pipe and definitely to fix the width of the band of the skin effect conductor-resistor beneath. A view in elevation of FIG. 5A and its conventional wiring diagram is shown in FIG. 15.

FIG. 5B is an enlargement of a cross-section of this special flat wire and shielding strips made up in a molded or extruded assembly of suitable insulation material. This may be applied, as is indicated in FIG. 5A and the previous figures, directly against the pipe wall. However, this form of the wire may be used — as also may those of the others of this invention, particularly as shown in FIGS. 3 and 4, — outside of the conventional thermal insulation as shown in FIG. 5B and with the conventional circuit in FIG. 16. The thermal insulation, 12, is of any usual thickness from 1 to 6 inches, and the conductor wire is simply held on its outside, with the return AC flow and the useful heat generated in the skin effect conductor-resistor subtended below and within the pipe wall.

THE CONDUCTOR WIRE AS A THERMOSTAT

The conductor wire which supplies one leg of an AC circuit with a band of skin effect resistor-conductor as the return leg, may be made advantageously of one of the specialized types of insulator-resistor cables which increases in resistance and lowers the current flow as the temperature increases. This is usually formed as a pair of wires in a cable with a special material between the two wires. This special material may be some synthetic plastic with a special filler; and the composite has a high electrical specific resistivity compared to that of the wires and increases its electrical resistance — thus decreases its heat generating ability — as its temperature increases. Such a material is said to have a Postive Temperature Coefficient. (PTC). The special cable thus acts as its own thermostat or control of the input of AC to devices of the prior art. An outer insulation covers both of the parallel wires and the connecting insulator-resistor, PTC, material. The two wires have always before been connected at one end of the cable to a source of either AC or DC. As the temperature of the cable, and the special insulator-resistor material between the two wires increases, its conducting capacity decreases. This flow of current between the two resistor-conductor wires and through these wires themselves, decreases. With lower heat input, the cable cools until a point of temperature is reached where the conductivity of the insulator-resistor material, which is uniformly distributed along the length of the two wires, is increased, more current flows, more heat is produced, and the cycle is repeated.

This prior art of heating cable has always had its two parallel wires on either side of the special plastic with PTC making up the insulator-resistor connected to the power source at the same end.

Now it has been found that if this heating cable is used in a somewhat different circuit as the conductor wire of a skin effect heating system, the thermostatic control of the heat produced is obtained not only in the cable itself, as in the prior art, but simultaneously there is controlled the current flow and heat produced in the return leg of the circuit, i.e., that part of the resistor-conductor due to the skin effect in the steel shape adjacent.

This novel connection, as shown in longitudinal cross-section in FIG. 6A and in transverse cross-section of FIG. 6B, is for heating a steel shape, 1, by means of the skin effect conductor-resistor band therein induced by AC flowing in the parallel conductor wires, 3' and 3'', with the general electrical insulation, 4. (For clarity in drawing, the wires are shown in elevation). The special insulator-resistor material, having a PTC 11, is in this case shown as a synthetic resin, which has a special filler added. It is part of an integrally molded cable between the two conductor wires, and inside the general insulation. Any similar system may be used which electrically connects the two wires uniformly throughout their length to increase the resistance between the wires and thus reduce the current flow as the cable is heated. The composition of this material, 11, and its method of electrical connection between the two wires, 3' and 3'', is not a part of this invention, nor is the fact that per se the electrical resistance and hence heat generated in this special insulator-resistor material, 11, is utilized to heat the steel shape, 1, as is the "line lose" of any other conductor wire which would be used. Furthermore, as in other embodiments of this invention, the conductor wires, here 3' and 3'', may be made of a metal which is an excellent conductor of electricity such as copper or aluminum, or of one as steel which is an intermediary conductor, or of one which is a poor conductor, such as one of the metals normally used for electrical resistance heating wire. In any case, these wires themselves will have a greater or less electrical resistance and heat generated as what is usually called the "line lose". This heat is added to a greater or lesser extent to the steel shape, 1, to add to that generated within the steel by the band of skin effect conductor-resistor.

Basically, when cold, the two parallel wires 3' and 3'' with the special insulator-resistor material, 11, act as a single element, conventional conductor wire in carrying AC from the (+) terminal of the AC source to the connection, 6, with a far end of the steel shape, 1, back through the band of skin effect resistance-conductor in 1, and thence through the connecting wire, 13, to the (−) terminal of the AC.

As the system — and particularly the special insulator-resistor material, 11, — heats up, it becomes more and more resistant to the flow of AC, and less current flows. Less heat is generated as what may be regarded here as line loss, as it is in the conventional use of this special type cable used for heating pipes directly. (In conventional use, both ends of two wires are connected directly from one end of the cable to the AC terminals, and one is not connected to the pipe as in this novel circuit.)

In the present invention, as the insulator-resistor material, 11, heats, its electrical conductivity decreases as does the electrical flow, not only in this, the out-leg of the electrical circuit, but particularly in the skin effect conductor-resistor band in the immediately adjacent steel shape which forms the return leg of the AC circuit and gives the substantial heat generating ability within the steel shape itself. The thermostatic effect of the cable itself (as hitherto used in the prior art) thus may be multiplied many times by controlling the skin effect current flow, and the heat effect thereby developed within the pipe or other steel shape itself.

FIGS. 6A and 6B illustrate the steel to be heated in section, 1, and the adjacent double wire cable assembly. It is obvious that the cable assembly may be either inside or outside a pipe wall, also that this steel section may be of other shape than a pipe wall, as hereinafter discussed for other wire conductors of this invention. Also, the cable assembly may be covered with an insulator shape, as in FIGS. 1 or 2. Such plastic covers of the type in these Figures, may be used for insulation or protection of the band of skin effect conductor-resistor beneath. Also the cable assembly may usually be placed with the flat side of the molded insulation against the steel shape in order to increase the proximity effect as above indicated.

HEATING WITH ANOTHER PIPE AS THE WIRE

FIG. 7 diagrams the cross-section of two transport pipes, 31 and 31', each of which acts also as the conductor wire adjacent to the other. An elevation and the circuit is shown in FIG. 17. There is thus a dual function for each, a mutual relation of wire and skin effect conductor-resistor. The number 31 is used as the combination of 3 for the conductor and 1 for the steel pipe, since both functions are realized here by a transport pipe. An electrical insulation means, 4, is a diagrammed as a flat ribbon of suitable material tangent to the two pipes; but such a ribbon may also be applied to the surface of one or both pipes, or it may be molded to the contour of the space between the two pipes which are nearly tangent. It serves to insulate from each other the skin effect conductor-resistor bands in the steel wall of each pipe, one, 31, acting as the "out" leg of the circuit, and the other, 31', acting as the "return" leg.

Terminals to the AC source are shown at 5 connected to the near end of 31, and at 5' connected to the near end of 31'. A jumper wire electrically connects the far ends of the two pipes to each other at junction 6 for 31, and 6' for 32'. The circuit thus established carries AC from the terminal 5 source to the near end, then through and out the skin band in 31 to the far end, through the jumper wire from 6 to 6', then back through the skin band in 31' to its near end, thence to the terminal 5'.

Both pipes are heated by the heat generated in the respective bands of skin effect conductor-resistors in that part of their respective wall sections closest to the other throughout their co-extensive lengths; and each of these bands acts as the usual wire conductor in developing the electromagnetic flux causing the skin effect and proximity effect phenomena in the other.

Because of the expanse of the two convex walls of the pipes adjacent to each other, this band in each pipe may be wider than desired; and the corresponding resistance less than desired. Shielding may be used to reduce the widths of these skin effect conductor bands as by two thin ribbons of conductor metal, 8, imbedded in the insulation, 4: as shown in FIGS. 5A and 5B.

While 31 and 31' are indicated as cross sections of transport pipes, and this may be the most useful application of this embodiment of the invention, other steel shapes or elongated strips may also be used with the same results; and the fluid being heated may be forced on the outside of the two shapes, rather than being transported inside the pipes as illustrated in FIG. 7. If means is provided for moving the shapes (e.g., pipes or others) farther apart, the skin effect and proximity effect serve to increase the effective resistance of the circuit, and less heat is generated, as shown with an ordinary conductor wire in FIG. 4. While in most cases it may be desirable to use shapes of uniform cross-section, there may be others where non-similar, elongated shapes in substantially parallel relation are more functional. The effective utility pertains only in that part where they are coextensive.

FIG. 8 is an expansion of the system of FIG. 7 applied to a supply of 3-phase AC, with three coextensive steel pipes, each of which has a band of skin effect conductor-resistor adjacent each of the other two pipes. Each band acts as the conductor wire for developing the corresponding and adjacent band of skin effect conductor-resistor in the adjacent pipe. Again, there is provided insulation, 4, here shown as a single molded shape, between each line of contact of the respective pairs of pipes; and again shielding may be provided in the insulators or otherwise although not shown in FIG. 8.

The AC circuit for FIG. 8 is shown in FIG. 18; and it is analogous to that of FIG. 17, expanded to include 3-phase AC, each phase 120° out of phase with the other two. The three terminals respectively 5, 5' and 5" of the AC source are indicated as small circles at the ends of the three wires, 13, 13', and 13", connected at the near ends of pipes, 31, 31', and 31", respectively. The far ends of each of the three pipe-wire combinations are connected by jumper wires between 6 and 6', 6' and 6", also 6" and 6, although only any two of these three jumper wires would suffice. Thus, the familiar "Y" connection is established at the far ends of 31', 31", and 31''' with balanced loading of each of three uniform pipes.

Here again, the three elongated shapes of FIG. 8, like those of FIG. 7, may be other than tubular. They may be the same in cross-section or of different cross-section and the fluid being heated may be forced against any part or all of their external surfaces, and they may be adjustable as to distance apart by pairs, so as to increase the resistance to AC flow through the circuit of a pair and thus the heat generated in the adjacent skin effect conductor-resistors.

HEATING OF STEEL SHAPES OTHER THAN PIPES

FIGS. 9A and 9B diagram a steel sheet, here assumed flat, although any other surface: cylindrical, conical, even spherical, or other warped surface, may be used. The surface may be a part of a heater; and means then may be provided to pass a fluid to be heated against its surface. The sheet steel, 1, corresponding to the transport pipe wall of the other figures, has attached thereto an insulated wire. 3. The wire also may have a plastic cover, as shown in FIGS. 1 and 2, again with narrow cracks between the cover and the steel substantially parallel to the wire and on its either side. The surface of the steel plate may be covered uniformly or otherwise with straight runs, return bends, or other patterns of the wire. However, no section of the wire is closer to another than about 50–100 times the value of the penetration depth. The one end of the wire is connected to the steel plate at the point, 9; and at a far corner, it leaves its attachment to the plate to be connected to one terminal (−) of the AC source. The other terminal (+) of the AC is connected to the steel plate at a point, 10, very near the point where the insulated wire leaves contact therewith.

All of the other embodiments of this invention, as those illustrated in all of the other Figures, may also be applied to one or more steel shapes other than pipe walls in conjunction with that diagrammed in FIGS. 9A and 9B and utilitarian fluid may be flowed against some surface of such steel shape or shapes as diagrammed by arrows in FIGS. 9A and 9B.

ATTACHMENT OF WIRES AND COVERS

Numerous means are available for holding to the pipe wall or plate the insulated conductor wires shown in the several Figures, also the covers of FIGS. 1 and 2. All have been used in the prior art in some similar services; and none are a part of this invention. These methods of attachment may depend on wiring, bolting, taping, clamping, cementing, etc. None should interfere more than a minimal amount with the thermal insulation which is invariably applied to a transport pipe, either in a pre-fabrication or in a field operation. In the prefabrication of thermally insulated and coated lengths of pipe, stub wires are left for electrical connection in the field following welding of the pipe joints.

ELECTRICAL INSULATION

The materials for electrical insulation of the conductor wire are discussed in U.S. Pat. No. 3,617,699, and in the copending application 107,351 now U.S. Pat. No. 3,777,117, of Dec. 4, 1973. Insulation of the conductor wires of this invention does not present nearly the problems mentioned in the copending application, because of relative lower temperature, and freedom from contact with the fluids being transported in the present installations where the wire is located outside the transport pipe. Similarly, the temperatures which the electrical insulation of the conductor wires must resist are very much less than those encountered in the insulation of conventional electric tracing wires used for heating. These are outside the pipe, and all of the heat generation must pass through the insulation at a temperature sufficiently high so as to transfer the heat into the pipe wall. In the present invention, much or substantially all of the heat produced is generated within the pipe wall itself; and thus only the heat from the relatively small line loss of the copper, aluminum, or steel conductor wire must be transferred through its insulation to the pipe wall. Correspondingly, there is a much lower temperature in the insulation and less difficulty in its design and operation.

In some cases, where particularly high temperatures are involved, and especially if the pipe is pre-insulated and pre-coated in a factory operataion, a special electrical insulation system may be used. This may be applied directly to the pipe wall as a mineral insulation of the types specified in the copending application, or as glass fibers specially impregnated with a high temperature-resistant, insulating resin, or others. The wire, preferably in ribbon form, may then be attached to the pipe on the outside of this electrical insulation and then covered with further electrical and thermal insulation, as specified.

THERMAL INSULATION

The type and specification of the thermal insulation used on a transport pipe heated by this system is, in general, outside of this invention. However, it has been found that pipelines already thermally insulated by many of the standard materials, when they are not an effective shield for an electromagnetic flux, may be heated by the method of this invention, in effect: through the insulation.

Thus, if an electrical conductor is laid on the outside of the existing insulation, and the circuit is wired as ordinarily, a band of skin effect conductor-resistor effectively heats the subtended part of the steel pipe wall, thus the entire wall and then the contents of the pipe. This is not nearly as efficient as when the wire is next to the pipe wall, since practically all of the line loss of the conductor wire is lost to the surroundings rather than being kept inside to heat the pipe itself.

However, this system may be applied in an existing, insulated pipeline in some cases of emergency, or when only a small amount of heating time is necessary per year. In these cases, any inefficiency in the use of power may be relatively unimportant. The wire may be applied either parallel to the axis or in a helical winding. The insulating covers of FIGS. 1 and 2 might be used; but the flat wires of FIGS. 4 and 5 do not show up so relatively advantageous at this distance from the pipe wall. The simple insulated wire of FIG. 3 would almost always be used, although FIG. 5B shows the application with a flat conductor wire.

In this particular usage, particularly if the pipe is above, but close to the ground, a somewhat greater efficiency may be gained if the wire is laid on the top of the insulation. Thus, the entire pipe circumference acts as a shield against the magnetic field from the conductor wire penetrating the earth to cause any possible current losses thereto. The same is true, but to a much lesser degree, with other wires laid directly on the pipe wall.

VARIABLE RESISTANCE AND HEAT INPUT

As above mentioned, the position of the conductor wire relative to the pipe changes the proximity effect and resistance of the skin effect conductor-resistor band. Moving the wire or the pipe relative to the other, or of another pipe which is part of the AC circuit, controls the resistance, the heat generated, and the temperature. In some cases this movement of pipe or wire may be done during operation by supplying suitable means to provide this relative movement of the parts.

FIG. 4 diagrams such a means and FIG. 14 indicates its circuit. A lever arm, 14, is attached rigidly to the insulation, 4. The other end of the lever arm is pivoted in a bearing block, 16, firmly attached by welding or otherwise to the pipe wall, 1. The lever arm moves on a pin, 15, in the bearing block to allow a rotary movement. A number of such arms spaced along the insulated wire, 4, moves it away from the pipe through an arc as shown. The electromagnetic field changes with increased distance as well as changing angle with the pipe wall of the rectangular wire, 4; and the skin effect conductor-resistor may have its resistance increased many times by swinging the lever arm and thus the wire, 3, away from the pipe wall to reduce, accordingly, the heat generated in the pipe. If the wire is of steel, with a skin effect conductor-resistor band therein carrying the current, the variance and hence control range may be expanded even more. If the transport pipe is moved relative to the wire, or relative to another transport pipe wherein the skin effect conductor-resistor band if formed along the adjacent surface of the coextensive lengths, the effect is the same; and the important point is in securing such increase of resistance and hence control of heat input by the separation of the two co-extensive legs of the AC circuit.

I claim:

1. A heat generating system comprising:
   a. an elongated shape made of metal having magnetic properties and electrical conductivity and having a first, near, end and a second, remote, end;
   b. means whereby a utilitarian fluid is caused to flow in direct contact with a surface of said elongated shape;
   c. an elongated electrical conductor means, positioned in closely adjacent but electrically insulated relationship with respect to an exterior surface of said shape throughout their respective lengths, said conductor means having a first, near, end adjacent said first end of said elongated shape and a second, remote, end adjacent said remote end of said elongated shape; said insulated conductor means being uncovered throughout those portions of its outer surface not directly confronting said shape by any electrically conductive material which would shield the electromagnetic field generated around said conductor means in a direction away from said shape;
   d. a source of AC having a first supply terminal and a second supply terminal;
   e. an electrical connection directly between said first AC terminal and said first, near, end of said elongated shape;
   f. an electrical connection between said second AC terminal and said first, near, end of said electrical conductor means;
   g. an electrical connection between said second, remote, end of said elongated shape and said second remote, end of said electrical conductor means;
   h. an AC circuit established:
      i. from said second terminal of said AC source through the substantial length of said electrical conductor means,
      ii. then back through said substantial part of the length of said elongated shape adjacent to said electrical conductor means so as to produce a skin effect current concentrated in a longitudinal band of that part of the skin of said elongated shape which is adjacent to said electrical conductor means, said elongated shape having at least twice the thickness of said skin, said skin effect current thus producing heat in said elongated shape; and
      iii. finally back to said first AC terminal, to complete said AC circuit, whereby
   i. at least some part of said heat produced in said elongated shape is transferred directly to said utilitarian fluid without passing through any other material.

2. In the system of claim 1, wherein said elongated shape wherein there is skin effect conduction of AC is a pipe through which said utilitarian fluid is caused to flow in contact with its inner surface.

3. In the system of claim 2, wherein said elongated electrical conductor means comprises a metal strip electrically insulated throughout its length and having a width greater than its thickness.

4. In the system of claim 3, wherein said electrical conductor means follows a helical pattern along the wall of said pipe.

5. In the system of claim 2, wherein said elongated conductor means has a layer of thermal insulating material between it and said pipe.

6. In the system of claim 2, wherein said elongated electrical conductor means follows a three-dimensional curved path in being formed along the wall of said pipe.

7. In the system of claim 1, wherein an elongated shape made of an electrical insulating material is placed to cover said electrical conductor means and said band of said elongated shape acting as a skin effect conductor-resistor, thereby electrically insulating said skin effect conductor-resistor.

8. In the system of claim 1, wherein said elongated shape has a planar surface in that part of its exterior surface which is most closely adjacent to said elongated insulated electrical conductor means throughout their respective lengths.

9. In the system of claim 8, wherein said elongated conductor means has a layer of thermal insulating material between it and said elongated shape.

10. In the system of claim 1, wherein said elongated electrical conductor means comprises a metal strip electrically insulated throughout its length and having a width greater than its thickness.

11. In the system of claim 1, wherein said elongated conductor means has a layer of thermal insulating material between its and said elongated shape.

12. In the system of claim 1, wherein said elongated electrical conductor means comprises:
    a. two electrically conductive wires, a first and a second, adjacent to each other and substantially parallel;
    b. means for electrically connecting said first wire to said second wire uniformly throughout their respective lengths, said means being made of a material with a positive temperature coefficient of resistance and having a relatively high electrical specific resistivity compared to that of the wires, and a higher electrical resistance at a higher temperature;
    c. an electrical connection between said second AC terminal and the end of said first wire which is near the electrical connection at said first end of said elongated shape and said first AC terminal;
    d. an electrical connection between said second end of said elongated shape and said second wire remote from the electrical connection of said first wire with said second AC terminal;
    e. an AC circuit established through said conductor means;
       i. from said second terminal of said AC source through the substantial length of said first wire;
       ii. through said means for electrically connecting said first wire to said second wire uniformly throughout their respective lengths;
       iii. to and through the substantial length of said second wire; and
       iv. to an electrical connection with said second end of said elongated shape; whereby
    f. said positive temperature coefficient of resistance and high specific resistivity of said means for electrically connecting said first wire to said second wire reduces the flow of AC as the temperature increases in said electrically connecting means of said first wire to said second wire and thus reduces the heat produced in, and the resulting temperature of, said elongated shape.

13. In the system of claim 12, wherein said elongated shape for skin effect conduction of AC is a pipe through which said utilitarian fluid is caused to flow in contact with its inner surface.

14. In the system of claim 12, wherein said elongated shape has a planar surface in that part of its exterior surface which is most closely adjacent to said elongated insulated electrical conductor means throughout their respective lengths.

15. In the system of claim 1, wherein said elongated electrical conductor means is made of a metal having magnetic properties and electrical conductivity.

16. In the system of claim 15, wherein both said elongated shape and said conductor means are the same in cross-section.

17. In the system of claim 1, wherein means is provided for adjustably spacing said electrical conductor means away from said elongated shape along at least some part of their coextensive lengths, so as to increase the resistance in said skin effect conductor-resistor band and thus lower the amount of AC current flow and heat generation therein.

18. In the system of claim 1, wherein an elongated band of a skin effect conductor-resistor is formed as a part of the skin of said elongated shape which is adjacent to said electrical conductor means; and said elongated band of a skin effect conductor-resistor is reduced in width by an elongated ribbon of an electrical conducting material running parallel to and on at least one side of said electrical conducting means, said ribbon being between said elongated shape and said electrical conductor means, and being electrically insulated from both said elongated shape and said electrical conductor means, whereby said ribbon shields said elongated shape from the electromagnetic field engendered by said AC current flow; and thus narrows said band of skin effect conductor-resistor whereby the electrical resistance of said band is increased.

19. A heat generating system comprising:
a. three elongated shapes, a first, a second, and a third, each of which is a pipe made of a metal having magnetic properties and electrical conductivity and having a first, near, end and a second, remote, end; said three pipes being positioned in closely adjacent but electrically insulated relationship with respect to the respective exterior surfaces of the other two; and with the respective near ends of said three pipes adjacent to each other, and with the respective far ends of said three pipes adjacent to each other;
b. means by which a utilitarian fluid is caused to flow through each of said pipes;
c. a source of three phase AC provided with a first supply terminal, a second supply terminal, and a third supply terminal;
d. means provided for an electrical connection directly between said near end of said first pipe with said first terminal, said near end of said second pipe with said second terminal, and said near end of said third pipe, with said third terminal;
e. means provided for electrically connecting together the remote ends of all three of said pipes in a "Y" connection; whereby
f. a three phase AC circuit is established, of which:
  i. a first single phase AC flows from said first terminal through the substantial length of the wall of said first pipe which is in a longitudinal band which is adjacent to the wall of said second pipe, and also in that part of th wall of said first pipe which is in an longitudinal band which is adjacent to the wall of said third pipe;
  ii. a second single phase AC flows from said second terminal through the substantial length of the wall of said second pipe which is in a longitudinal band which is adjacent to the wall of said first pipe, and also in that part of the wall of said second pipe which is in a longitudinal band which is adjacent to the wall of said third pipe;
  iii. a third single phase AC flows from said third terminal through the substantial length of the wall of said third pipe which is in a longitudinal band which is adjacent to the wall of said first pipe, and also in that part of the wall of said third pipe which is in a longitudinal band which is adjacent to the wall of said second pipe;
  iv. and then each of these three circuits for the respective single phases passes through said "Y" connection at the far ends of all three of the respective pipes;
  v. finally each of these respective three flows of single phase AC returns back to the other two of said three terminals through the substantial lengths of the walls of the other two respective pipes which are in longitudinal bands adjacent to the respective pipe carrying said AC single phase out from its respective terminals;
g. each particular one of said three phases of AC produces by its flow out from its respective terminal a skin effect current concentrated in the respective longitudinal bands of those parts of the skin of the walls of the particular pipe which are adjacent to the walls of the other two pipes; and the same particular one of the three phases produces by its flow from the "Y" connection back to the other two terminals a skin effect current concentrated in the longitudinal bands of those parts of the wall of each of the other two pipes which are adjacent to the walls of the particular pipe;
h. each of said three pipes has a wall at least twice the thickness of said skin through which said AC flows to produce heat in each of said pipes; whereby
i. at least some part of said heat produced in each of said pipes is transferred directly to said utilitarian fluid without passing through any other material.

20. In the system of claim 19 wherein the cross-section of each of said three elongated steel pipes are substantially identical; the same utilitarian liquid flows in each of said pipes; and, at any cross section of said three pipes, their centers are approximately equidistant.

* * * * *